Figure 1:
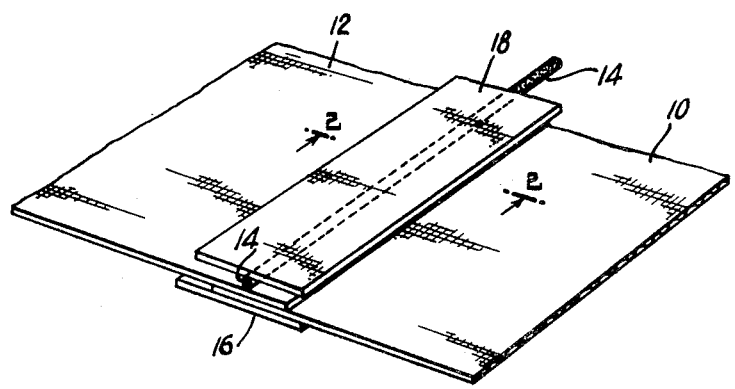

May 26, 1964

G. J. LISTNER 3,134,703

METHOD OF SPLICING A PLURALITY OF LAYERS OF SHEET MATERIAL

Filed Feb. 13, 1961

INVENTOR
GREGORY J. LISTNER
BY
Alexander T. Kardos

ATTORNEY

3,134,703
METHOD OF SPLICING A PLURALITY OF LAYERS OF SHEET MATERIAL
Gregory J. Listner, South Brunswick Township, Middlesex County, N.J., assignor, by mesne assignments, to Johnson & Johnson, New Brunswick, N.J., a corporation of New Jersey
Filed Feb. 13, 1961, Ser. No. 88,720
10 Claims. (Cl. 156—157)

The present invention relates to the splicing or adhering together of portions of sheet material and more particularly is concerned with the splicing of ends of fabrics by means of a thermoplastic composition.

In the manufacture of certain types of sheet materials, such as woven or nonwoven fabrics, it is often desirable to splice lengths of such materials together so that the trailing end of one length of the material can pull the leading end of the next length of material through further apparatus for additional processing. Hitherto, such splicing has normally been accomplished by interposing a strip or a tape of a suitable thermoplastic material between the overlapped end portions of the two lengths of sheet materials and applying heat and pressure to fuse the thermoplastic material into a binding splice capable of holding the two ends together.

Such a method of splicing, however, has not been found completely satisfactory or acceptable to industry. For example, in the case of polyvinyl chloride or other chloride-containing resins, the application of heat and pressure had to be extended over such a period of time that there was a release of hydrogen chloride from the resin which "tendered" the sheet material, particularly if cellulosic, whereby it undesirably lost tensile strength. Additionally, there were simultaneously created double bonds in the resin polymer chain, causing degradation and embrittlement of the resin. Such was, of course, highly undesirable. Additionally, there was a pronounced tendency to shrinkage or "necking-in" during subsequent processing, such as scouring, bleaching and predrying, whereby considerable waste was created when the sheet material had to be tentered or otherwise stretched and dried to size.

It is a prinicpal purpose of the present invention to provide methods of splicing or adhering together portions or lengths of sheet material, either woven, nonwoven or otherwise, and even cellulosic in nature, whereby the splicing material is not degraded or embrittled, the sheet material is not tendered, and there is a considerably reduced tendency towards shrinkage or "necking-in."

Such a principal purpose may be achieved by using as the splicing material a plastisol dispersion comprising a thermoplastic resin and a plasticizer; applying such a plastisol dispersion to the desired portions or ends of lengths of sheet material, and heating such a plastisol dispersion for a very short period of time during which it is capable of rapidly becoming fluid and then intimately gelling and fusing to join the portions or ends of the sheet material without causing the resin to become degraded or embrittled, without tendering the sheet material, and without creating therein any substantial tendency towards shrinkage or "necking-in."

In the following specification and accompanying drawing, there is described and illustrated a preferred embodiment of the invention but it is to be understood that the invention is not to be limited thereto, except as determined by the scope of the appended claims. In the drawing, FIGURE 1 is a schematic fragmentary view in cross-section showing the ends of two lengths of fabric being spliced; and FIGURE 2 is a schematic fragmentary view in cross-section showing the completed splice.

In the embodiment of the invention illustrated in the drawing and with particular reference to FIGURE 1 thereof, an end of one fabric 10 is overlapped over the end of another fabric 12 and a thin bead 14 of the plastisol dispersion is applied in a continuous stream to the overlapped portion for its full width. A pair of heat resistant tapes 16 and 18, made of a high melt point material such as "Fiberglas," "Teflon" (polytetrafluoroethylene) made by Du Pont and Company or "Scotch" made by Minnesota Mining and Manufacturing Company, is placed on each side of the overlapped portion over the continuous bead 14 and pressure and heat are applied by a hand iron, roller, platen, or other desired means.

Figure 2:
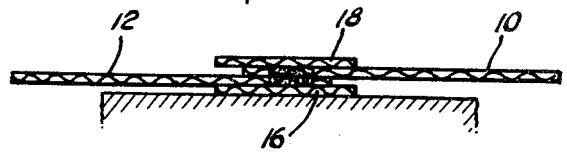

The continuous bead 14 rapidly becomes fluid and spreads out and intimately splices or interconnects the ends of the fabrics 10 and 12, as shown in FIGURE 2. Gelation and fusion take place very rapidly. A few seconds are permitted for the splice to cool and the heat resistant tapes 16 and 18 are removed. The splice is completed and ready to be used. Its edges may be trimmed, if desired.

The temperatures to which the plastisol dispersion must be heated will vary widely depending upon the nature and characteristics of the resin and the plasticizer used, their relative proportions, the inclusion of other materials, etc. Normally, the temperatures used range from about 300° F. to about 375° F. Such temperatures, at first glance, would appear to be as high as temperatures used in the prior art and it would be expected that there could be a similar release of hydrogen chloride from the vinyl chloride-containing resin. It should be realized, however, that the plastisol dispersion is initially a paste or a semi-liquid hence the duration of the exposure to the elevated temperatures is reduced considerably. The heating, softening, gelling and fusing is so rapid that there is substantially no time for the development and release of the hydrogen chloride from the resin.

Low-temperature-fusing plastisols are of use where such low temperatures may be tolerated in the final product. Although most plastisols require temperatures of at least 300° F. for complete fusion, these low-temperature-fusion plastisols often may be fused at temperatures between about 200° F. and 250° F., and in some instances as low as about 185° F. Such are of use where more delicate fabrics are involved. Normally, however, when there is a requirement that the splice be capable of withstanding elevated temperatures subsequent to formation, the conventional plastisols using temperature ranges of from about 300° F. to about 375° F. are used.

Other additional advantages realized by the use of a plastisol dispersion in pasty or semi-liquid form are many. First, there is a much greater and more intimate contact between the fabrics to be adhered or spliced. When using a conventional thermoplastic tape or fabric, such as noted in the prior art, there is a slower and lesser heat-softening of the thermoplastic tape and the fabrics to be spliced are usually fused or partially embedded to each side of the tape and do not actually contact each other very much. On the other hand, when the pasty or semi-liquid plastisol is used, the fabrics may be initially placed in direct contact with each other and the plastisol, being very fluid, especially when the heat is initially applied, flows to, into and around the yarns and strands of the fabric being spliced. This is particularly noticeable even when a fine fabric such as 80 x 80 or even finer is used. A conventional thermoplastic tape must be interposed between the finer fabrics to be spliced in order for it to work; a plastisol may be applied to either side and will flow through the interstices or openings of the fabrics, filling all minute crevices therein.

Another advantage of the use of a pasty, semi-liquid plastisol is its application to splicing heavy weight materials and fabrics. The conventional thermoplastic tapes had to be heated considerably so that they could be rendered sufficiently fluid to penetrate these heavy weight materials sufficiently to provide a good bond. This, unfortunately, could not be done in many cases without seriously damaging the resin in the tape or the heavy weight materials themselves. The pasty, semi-liquid plastisol, however, readily penetrates and successfully bonds the heavy weight materials without any great effort and without causing any damage thereto.

Still another important advantage is that the pasty, semi-liquid plastisol is positioned and activated in a completely relaxed, unoriented state without any internal stresses or strains. As a consequence, there is very little tendency towards shrinkage or "necking-in." However, when a conventional thermoplastic tape or fabric is used, there often is orientation in the tape or there are fabrication stresses or strains in the fabric, whereby there is an increased tendency towards shrinkage and "necking-in." Mere handling and positioning of a conventional thermoplastic tape has been found to create a potential tendency towards shrinkage or "necking-in."

The invention is naturally particularly applicable to cellulosic sheet materials such as woven or nonwoven fabrics made of natural cellulosic fibers notably cotton and flax, or synthetic or man-made cellulosic fibers notably regenerated cellulose or rayon fibers. This is so because of the greater potential damage which could be done to these cellulosic fabrics by the release of hydrogen chloride by the chloride-containing polymers under the influence of heat. Within the broader aspects of the present invention, however, and particularly in view of the advantages of the increased resistance to shrinkage and "necking-in," the invention is applicable to other natural or synthetic materials such as wool, silk, polyamides, poly esters, polyacrylics, etc. Naturally, with these other materials, different temperature ranges are employed, depending upon the nature and characteristics of the particular material used.

Although the present invention will be described with particular reference to thermoplastic plastisol dispersions made from polyvinyl chloride resins, such is intended primarily as illustrative only. It is apparent that other resins could be used, such as vinyl copolymers in which vinyl chloride is usually the predominant constituent such as in vinyl chloride-vinylidene chloride resins, vinyl chloride-vinyl acetate copolymers, etc.; other vinyl resins such as polyvinylidene chloride, polyvinyl acetate, etc.; acrylic resins such as methyl methacrylate; cellulosic ester or ether resins such as nitrocellulose, ethyl cellulose, etc.; and the like. The only requirement is that the resin be compatible with the selected plasticizer capable of forming a plastisol dispersion therewith in desired proportions.

The particular plasticizer which is used may be selected from a large group of known plasticizers and depends, of course, upon the particular resin used and upon the conditions of its manufacture and use. When the resin is polyvinyl chloride, the phthalate esters, di-(2-ethylhexyl), di-n-octyl, diisooctyl, dibutyl, dicapryl, etc., are commonly used. Other plasticizers of use are the phosphate esters, tricresyl, trioctyl, triphenyl, etc.; the adipate esters, diisooctyl, diisodecyl, di-(2-ethylhexyl), etc.; the sebacate and azelate esters; etc. Polymeric or resinous plasticizers, such as the polyesters of adipic, azelaic or sebacic acid with glycols terminated with long chain fatty acids may also be used, in addition to the above-mentioned monomeric plasticizers.

The relative proportions of the resin and the plasticizer may be varied widely, depending upon the nature and compatibility of the resin and the plasticizer themselves, as well as the conditions of manufacture and use. For example, from about 5 parts to about 80 parts by weight of the plasticizer and from about 20 parts to about 95 parts by weight of the resin may be used. Within the more commercial aspects of the present invention, from about 10 parts to about 60 parts by weight of the plasticizer is preferred, with optimum results being obtained at from about 30 parts to about 50 parts by weight of the plasticizer.

The amount of thermoplastic plastisol dispersion which is used to splice the sheet materials together will depend upon many factors, notably the nature, characteristics and weight of the sheet materials being spliced. The width of the bead of plastisol deposited is an excellent way to determine the amount applied. For light sheet materials and fabrics, or for very fine, closely woven fabrics, beads having a width or diameter of only about 3/16 inch have been found sufficient. For heavy sheet materials, or for very coarse, loosely woven fabrics, beads having a width of up to about 1/4 inch or even more have been found necessary. Within the more commercial aspects of the present invention, bead widths of from about 1/8 inch to about 3/16 inch have been found generally satisfactory. These widths, of course, refer to the widths of the plastisol bead before the application of the heat and pressure. Subsequent to such treatment, the bead is usually flattened to many times its original width.

If desired, other materials may be included in the plastisol dispersion to provide specific properties and desired characteristics. As examples of such additions, there may be cited pigments, dyes, fillers, stabilizers, UV absorbers, lubricants, etc. These may be dispersed along with the resin, or they may be added at a later stage, usually as a dispersion in the plasticizer.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

In order to prepare the splice, two ends of lengths of 40-inch-wide woven cotton fabrics (44 x 36) are overlapped on top of a tape of "Teflon"-coated "Fiberglas" cloth. The "Fiberglas" cloth is approximately 5 mils thick, 3 inches wide and several inches longer than the width of the woven cotton fabrics. The overlapped fabrics are held in position on top of the "Fiberglas" cloth by means of clamping pins at each corner. A thermoplastic polyvinyl chloride plastisol containing about 60 parts by weight of polyvinyl chloride resin and about 40 parts by weight of dioctyl phthalate is applied to the top of the second length of woven fabric in a continuous bead about 1/8 inch in diameter. The polyvinyl chloride plastisol is pasty or semi-liquid and is applied by means of a polyethylene squeeze bottle having a suitable opening. A second "Teflon"-coated "Fiberglas" cloth is then placed on top of the polyvinyl chloride plastisol bead and pressed down lightly manually.

After the second "Teflon"-coated "Fiberglas" cloth is in position, the seam is immediately heat-set with a flat hand iron set at a temperature of about 450° F., using only very light pressure on the order of about 1/4 pound per square inch and pressing the hand iron over the splice at a speed of about 1 foot per second. The temperature of the plastisol resin reaches about 325°–350° F. momentarily. Three passes of the iron over the splice are usually enough to insure a good, strong seam. A few seconds are allowed for the splice to cool and the "Teflon"-coated "Fiberglas" cloth is then removed. The splice is ready for immediate use.

The plastisol resin is not degraded or damaged in any way and the cotton fabrics are not tendered in any manner.

No failures occur when the above-described splice is tested in an oven at about 325° F. for about 5 minutes at a tension of about 1/4 pound per linear inch of the splice. Numerous splices of this type are also tested by being passed in direct contact with hot drying cans heated by steam at a pressure of about 60 pounds per square inch (p.s.i.g.). Again, no failures occur, even when the splices are stopped for several minutes in direct contact with the hot drying cans. Also of value is the fact that no shrinkage or "necking-in" of the splices occur when they are heated to such temperatures. This is extremely important if the splice is used on materials to be subsequently finished, since shrinkage of a splice during scouring, bleaching or predrying causes "necking-in" which results in waste during tentering. This splice is inert to all these finishing treatments.

This techinique of splicing is applicable to the fabrication of materials or to stitchless seaming, for example, the assembly of zippers, fasteners and hems. The completed splice has all the desirable properties of softness, wash and shrinkage resistance, etc.

*Example II*

The procedures of Example I are followed substantially as set forth except that the material being "spliced" is the lower portion of a cotton skirt in which a hem is formed and then adhered to the body of the skirt. The "plastisol" or stitchless hemming is satisfactory.

*Example III*

The procedures of Example I are carried out substantially as set forth therein with the exception that the pasty, semi-liquid thermoplastic plastisol dispersion comprises 50 parts by weight of nitrocellulose and 50 parts by weight of DOP (dioctyl phthalate). The results are comparable.

*Example IV*

The procedures of Example I are carried out substantially as set forth therein with the exception that the pasty, semi-liquid thermoplastic plastisol dispersion comprises 50 parts by weight of ethyl cellulose and 50 parts by weight of DOP (dioctyl phthalate). The results are comparable.

*Examples V and VI*

The procedures of Example I are followed substantially as described therein with the exception that the proportions of polyvinyl chloride to dioctyl phthalate are changed to 50:50 by weight and 70:30 by weight, respectively. The results are comparable, taking into account the increased and decreased amounts of dioctyl phthalate present.

*Example VII*

The procedures of Example I are followed substantially as set forth therein except that the fabrics being spliced are made of 1½ denier, 1 9/16 staple length viscose rayon fibers instead of cotton. The results are comparable.

*Example VIII*

The procedures of Example I are followed substantially as set forth therein except that the fabrics being spliced are nonwoven fabrics weighing 450 grains per square yard and comprising a 50-50 mixture by weight of cotton fibers and 1½ denier, 1 9/16 inch staple length viscose rayon fibers. The results are comparable.

Although several specific examples of the inventive concept have been described, the same should not be construed as limited thereby nor to the specific substances mentioned therein but to include various other compounds of equivalent constitution as set forth in the claims appended hereto. It is understood that any suitable changes, modifications and variations may be made without departing from the spirit and scope of the invention.

What is claimed is:

1. The method of splicing together the ends of a plurality of layers of sheet material which comprises bringing a portion of each of said layers into contact, applying to the contacting portions of said layers in a line extending across the width of said contacting layers a pasty, semi-liquid, thermoplastic plastisol dispersion of a resin and a plasticizer therefor, and then subsequently heating said plastisol to raise its temperature and reduce its viscosity initially whereby it rapidly becomes fluid and intimately joins the contacting portions of said layers before ultimately gelling and fusing to permanently join said layers in a relatively shrink-proof splice, the temperature and duration of time being insufficient to damage or degrade the sheet materials or the applied plastisol.

2. The method of splicing together the ends of a plurality of layers of sheet material which comprises bringing a portion of each of said layers into contact, applying to the contacting portions of said layers in a line extending across the width of said contacting layers a pasty, semi-liquid, thermoplastic plastisol dispersion of a polyvinyl chloride resin and a plasticizer therefor, and then subsequently heating said plastisol to raise its temperature and reduce its viscosity initially whereby it rapidly becomes fluid and intimately joins the contacting portions of said layers before ultimately gelling and fusing to permanently join said layers in a relatively shrink-proof splice, the temperature and duration of time being insufficient to damage or degrade the sheet materials or the applied plastisol.

3. The method of splicing together the ends of a plurality of layers of cellulosic sheet material which comprises bringing a portion of each of said cellulosic layers into contact, applying to the contacting portions of said cellulosic layers in a line extending across the width of said contacting layers a plastisol, and then subsequently heating said plastisol to raise its temperature and reduce its viscosity initially whereby it rapidly becomes fluid and intimately joins the contacting portions of said cellulosic layers before ultimately gelling and fusing to permanently join said cellulosic layers in a relatively shrink-proof splice, the temperature and duration of time being insufficient to damage or degrade the cellulosic sheet materials or the applied plastisol.

4. The method of splicing together the ends of a plurality of layers of sheet material which comprises bringing a portion of each of said layers into contact, applying to the contacting portions of said layers in a line extending across the width of said contacting layers a pasty, semi-liquid, thermoplastic plastisol dispersion of a resin and a plasticizer therefor, positioning said layers with the plastisol applied thereto between heat resistant layers of high melt point material, and then subsequently heating said plastisol to raise its temperature and reduce its viscosity initially whereby it rapidly becomes fluid and intimately joins the contacting portions of said layers before ultimately gelling and fusing to permanently join said layers in a relatively shrink-proof splice, the temperature and duration of time being insufficient to damage or degrade the sheet materials or the applied plastisol.

5. The method of splicing together the ends of a plurality of layers of sheet material which comprises bringing a portion of each of said layers into contact, applying to the contacting portions of said layers in a line extending across the width of said contacting layers a pasty, semi-liquid, theremoplastic plastisol dispersion of a polyvinyl chloride resin and a plasticizer therefor, positioning said layers with the plastisol applied thereto between heat resistant layers of high melt point material, and then subsequently heating said plastisol to raise its temperature and reduce its viscosity initially whereby it rapidly becomes fluid and intimately joins the contacting portions of said layers before ultimately gelling and fusing to permanently join said layers in a relatively shrink-proof splice, the temperature and duration of time being insufficient to damage or degrade the sheet materials or the applied plastisol.

6. The method of splicing together the ends of a plurality of layers of cellulosic sheet material which comprises bringing a portion of each of said cellulosic layers into contact, applying to the contacting portions of said cellulosic layers in a line extending across the width of said contacting layers a plastisol, positioning said layers with the plastisol applied thereto between heat resistant layers of high melt point material, and then subsequently heating said plastisol to raise its temperature and reduce its viscosity initially whereby it rapidly becomes fluid and intimately joins the contacting portions of said cellulosic layers before ultimately gelling and fusing to permanently join said cellulosic layers in a relatively shrink-proof splice, the temperature and duration of time being insufficient to damage or degrade the cellulosic sheet materials or the applied plastisol.

7. The method of splicing together the ends of a plurality of layers of sheet materials which comprises:
   bringing a portion of each of said layers of sheet materials into contact;
   applying to one of the contacting portions of said layers of sheet materials a pasty, semi-liquid, thermoplastic plastisol dispersion of a resin and a plasticizer therefor;
   placing heat resistant layers of high melt point material on each side of said contacting portions of said layers of sheet materials to confine the applied plastisol dispersion therebetween;
   initially reducing the viscosity of the confined plastisol dispersion by heating the same whereby it rapidly becomes fluid and flows to intimately contact the contacting portions of said layers of sheet materials;
   ultimately gelling and fusing the confined plastisol dispersion by continuing to heat the same to join said layers of sheet materials in a relatively shrink-proof splice, the temperature and duration of time of said heating steps being insufficient to damage or degrade the layers of sheet materials or the applied plastisol dispersion; and
   removing said heat resistant layers of high melt point material from the spliced ends of the plurality of layers of sheet materials.

8. The method of splicing together the ends of a plurality of layers of sheet materials which comprises:
   bringing a portion of each of said layers of sheet materials into contact;
   applying to one of the contacting portions of said layers of sheet materials a pasty, semi-liquid, thermoplastic plastisol dispersion of a resin and a plasticizer therefor;
   placing heat resistant layers of high melt point material on each side of said contacting portions of said layers of sheet materials to confine the applied plastisol dispersion therebetween;
   initially reducing the viscosity of the confined plastisol dispersion by heating the same whereby it rapidly becomes fluid and flows to intimately contact the contacting portions of said layers of sheet materials; and
   ultimately gelling and fusing the plastisol dispersion by continuing to heat the same to join said layers of sheet materials in a relatively shrink-proof splice, the temperature and duration of time of said heating steps being insufficient to damage or degrade the layers of sheet materials or the applied plastisol dispersion.

9. The method of splicing together the ends of a plurality of layers of sheet materials which comprises:
   bringing a portion of each of said layers of sheet materials into contact;
   applying to one of the contacting portions of said layers of sheet materials a pasty, semi-liquid, thermoplastic plastisol dispersion of a resin and a plasticizer therefor;
   placing heat resistant layers of high melt point material on each side of said contacting portions of said layers of sheet materials to confine the applied plastisol dispersion therebetween;
   applying heat and pressure directly to at least one of said heat resistant layers of high melt point material to heat said confined plastisol dispersion to raise its temperature and reduce its viscosity initially whereby it rapidly becomes fluid and flows to intimately contact the contacting portions of said layers of sheet materials before ultimately gelling and fusing to permanently join said layers of sheet materials in a relatively shrink-proof splice, the temperature and duration of time being insufficient to damage or degrade the layers of sheet materials or the applied plastisol; and
   removing said heat resistant layers of high melt point material from the spliced ends of the plurality of layers of sheet materials.

10. The method of splicing together the ends of a plurality of layers of sheet materials which comprises:
    bringing a portion of each of said layers of sheet materials into contact;
    applying to one of the contacting portions of said layers of sheet materials a pasty, semi-liquid, thermoplastic plastisol dispersion of a resin and a plasticizer therefor;
    placing heat resistant layers of high melt point material on each side of said contacting portions of said layers of sheet materials confine the applied plastisol dispersion therebetween; and
    applying heat and pressure directly to at least one of said heat resistant layers of high melt point material to heat said confined plastisol dispersion to raise its temperature and reduce its viscosity intially whereby it rapidly becomes fluid and flows to intimately contact the contacting portions of said layers of sheet materials before ultimately gelling and fusing to permanently join said layers of sheet materials in a relatively shrink-proof splice, the temperature and duration of time being insufficient to damage or degrade the layers of sheet materials or the applied plastisol.

References Cited in the file of this patent
UNITED STATES PATENTS

| | | |
|---|---|---|
| 2,578,664 | Beery | Dec. 18, 1951 |
| 2,607,715 | Waldes | Aug. 19, 1952 |
| 2,737,466 | Utermohlen | Mar. 6, 1959 |
| 2,744,844 | Wood et al. | May 8, 1956 |
| 3,008,862 | Haine | Nov. 14, 1961 |

FOREIGN PATENTS

| | | |
|---|---|---|
| 1,096,930 | Germany | Jan. 12, 1961 |